US009154914B2

(12) United States Patent
Haverinen

(10) Patent No.: US 9,154,914 B2
(45) Date of Patent: Oct. 6, 2015

(54) APPLYING INDOOR MAGNETIC FIELDS FOR ACQUIRING MOVEMENT INFORMATION

(71) Applicant: INDOORATLAS OY, Oulu (FI)

(72) Inventor: Janne Haverinen, Kiviniemi (FI)

(73) Assignee: INDOORATLAS OY, Oulu (FI)

( * ) Notice: Subject to any disclaimer, the term of this patent is extended or adjusted under 35 U.S.C. 154(b) by 75 days.

(21) Appl. No.: 13/859,944

(22) Filed: Apr. 10, 2013

(65) Prior Publication Data

US 2013/0295957 A1    Nov. 7, 2013

(30) Foreign Application Priority Data

May 3, 2012   (FI) ...................................... 20125483

(51) Int. Cl.
| H04W 24/00 | (2009.01) |
| H04W 4/02 | (2009.01) |
| H04W 4/04 | (2009.01) |
| G01C 21/00 | (2006.01) |
| G01S 19/13 | (2010.01) |

(52) U.S. Cl.
CPC .............. H04W 4/023 (2013.01); G01C 21/00 (2013.01); G01S 19/13 (2013.01); H04W 4/027 (2013.01); H04W 4/04 (2013.01); H04W 4/043 (2013.01)

(58) Field of Classification Search
USPC ....................................................... 455/456.1
See application file for complete search history.

(56) References Cited

U.S. PATENT DOCUMENTS

| 6,198,930 | B1 * | 3/2001 | Schipper ....................... 455/440 |
| 6,549,004 | B1 | 4/2003 | Prigge |
| 6,957,088 | B2 * | 10/2005 | Kato et al. .................... 455/566 |
| 7,565,169 | B1 * | 7/2009 | Theobold ....................... 455/561 |
| 7,567,822 | B2 * | 7/2009 | Hart et al. ................... 455/562.1 |
| 8,315,674 | B2 * | 11/2012 | Lindner ......................... 455/566 |
| 8,351,971 | B2 * | 1/2013 | Spjuth ........................... 455/518 |
| 2011/0294517 | A1 | 12/2011 | Hahm et al. |
| 2014/0004885 | A1 * | 1/2014 | Demaine .................... 455/456.3 |

FOREIGN PATENT DOCUMENTS

| JP | A-2011-059091 | 3/2011 |
| KR | 10-2011-0072357 A | 6/2011 |

OTHER PUBLICATIONS

Finnish Office Action issued in Application No. 20125483; Dated Dec. 17, 2012.
Finnish Search Report issued in Application No. 20125483; Dated Dec. 17, 2012.

* cited by examiner

Primary Examiner — Temica M Beamer
(74) Attorney, Agent, or Firm — Oliff PLC

(57) ABSTRACT

An apparatus caused at least to acquire information indicating first indoor magnetic field vectors measured by a first portable device inside a building; generate a first indoor magnetic field sequence, IMFS, on the basis of the first indoor magnetic field vectors; acquire information indicating second indoor magnetic field vectors measured by a second portable device inside the building; generate a second IMFS on the basis of the second indoor magnetic field vectors, wherein the first and the second IMFSs represent at least one of the magnitude and the direction of the Earth's magnetic field; perform a comparison between at least part of the first IMFS and at least part of the second IMFS; and acquire information on the relative movement of the first portable device with respect to the second portable device inside the building on the basis of the comparison result.

15 Claims, 6 Drawing Sheets

APPLYING INDOOR MAGNETIC FIELDS FOR ACQUIRING MOVEMENT INFORMATION

FIELD

The invention relates generally to application of indoor magnetic fields. More particularly, the invention relates to determining relative movements between devices on the basis of variations in measured Earth's magnetic field.

BACKGROUND

It may be possible to locate or track a person associated with a specific device indoors via a radio frequency (RE)-based tracking. Tracking people indoors on the basis of variations in the Earth's indoor magnetic field has also been proposed. This type of location discovery typically applies magnetic field strengths measured by a magnetometer carried by the person. The measured strength is compared to an existing indoor magnetic field map to derive the location of the magnetometer, and thus, the person.

However, the above techniques for detecting persons' movements require knowledge of an indoor map, such as the indoor magnetic field map. This drawback limits the application of these techniques only to certain buildings. In a building for which such indoor map is not available, these techniques may not be directly applied for acquiring knowledge of the persons' movements. Nevertheless, it may be of importance to detect movements at least on some level in any building, regardless of whether or not a map is available for the building.

BRIEF DESCRIPTION OF THE INVENTION

According to an aspect of the invention, there is provided an apparatus as specified in claim 1.

According to an aspect of the invention, there is provided a method as specified in claim 14.

According to an aspect of the invention, there is provided a computer program product as specified in claim 15.

According to an aspect of the invention, there is provided a computer-readable distribution medium carrying the above-mentioned computer program product.

According to an aspect of the invention, there is provided an apparatus comprising a processing system configured to cause the apparatus to perform any of the embodiments as described in the appended claims.

According to an aspect of the invention, there is provided an apparatus comprising processing means configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents a floor plan of a building;

Figure 7A:
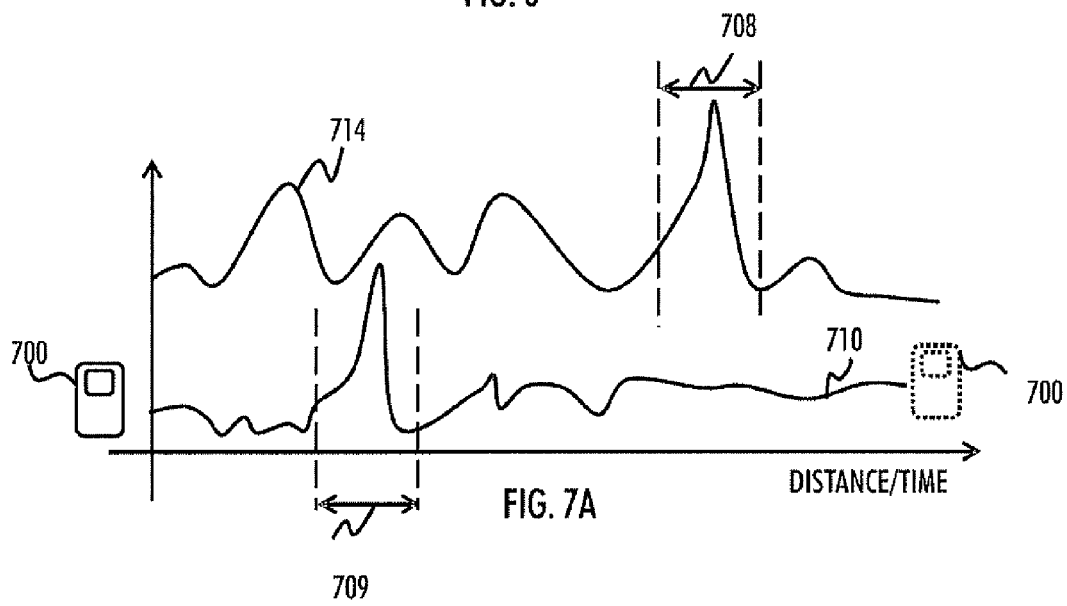
Figure 7B:
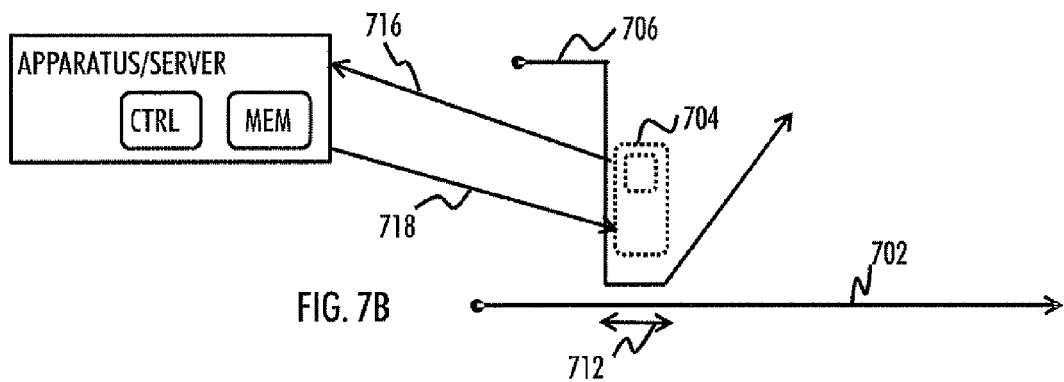
Figure 8:
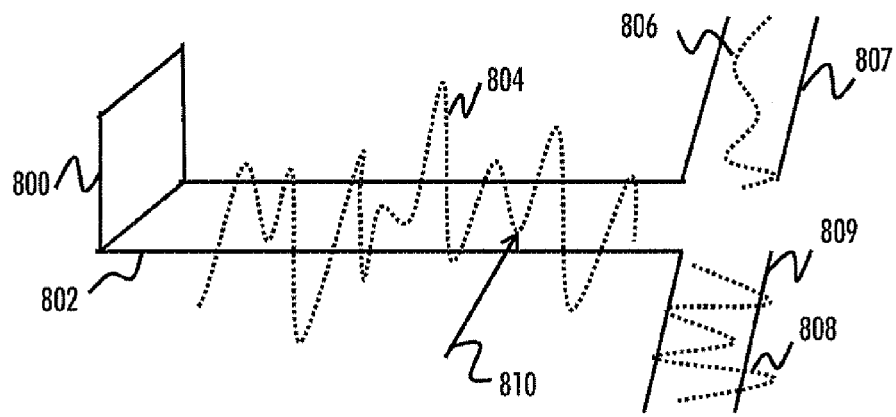
Figure 9A:
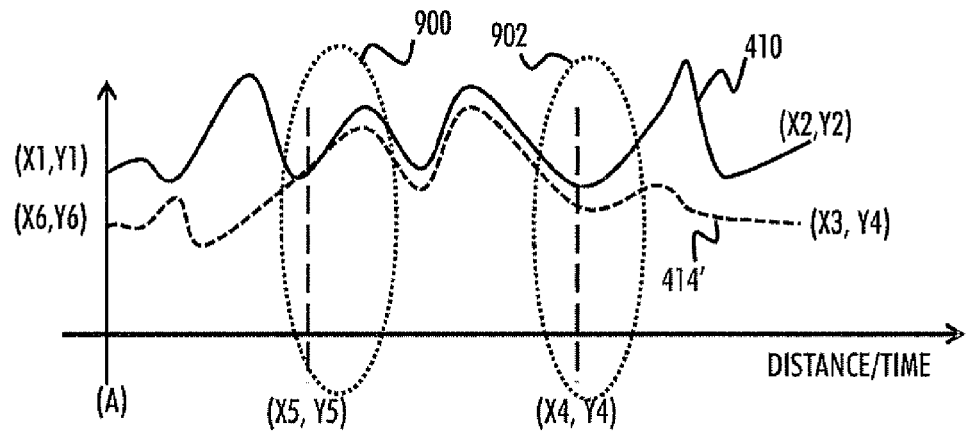
Figure 9B:
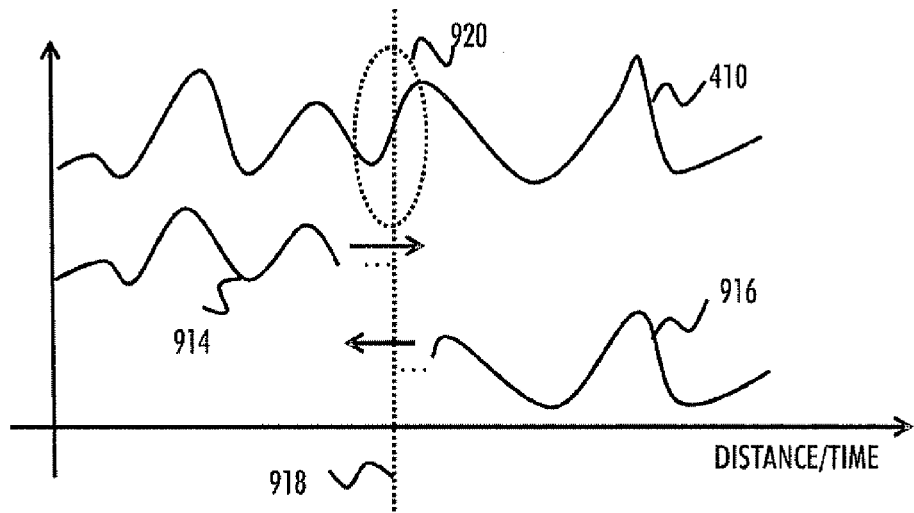
Figures 10A, 10B, 10C:
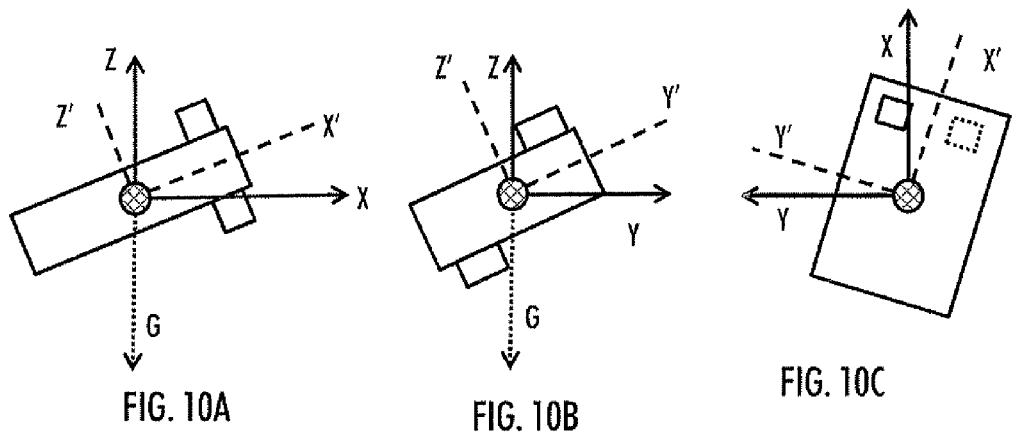
Figure 11:
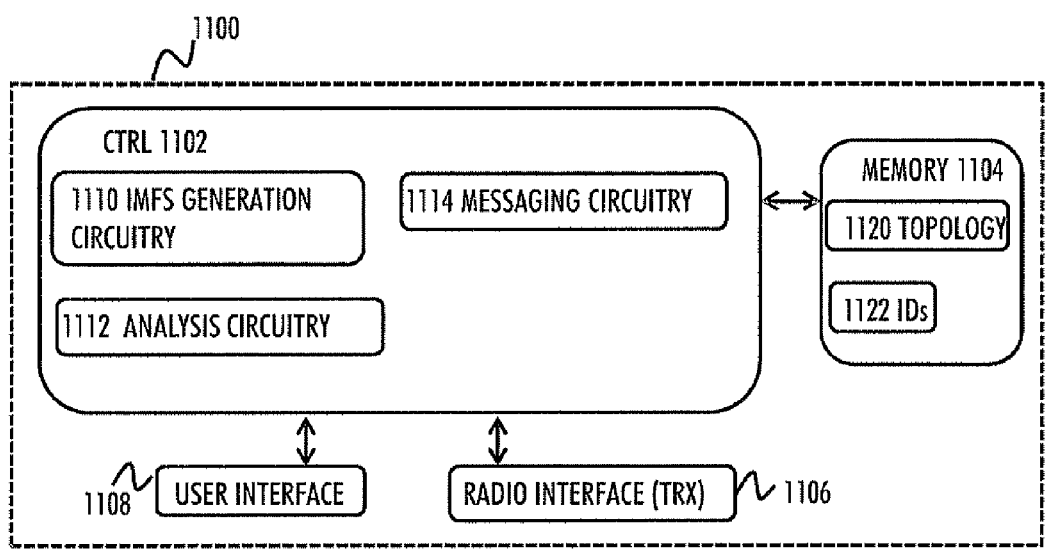

FIG. 7B presents how messaging is performed in an embodiment;

FIG. 8 depict an example of a popular location in the building, according to an embodiment;

FIG. 9A illustrates how knowledge of topology of the building may be acquired, according to an embodiment;

FIG. 9B illustrates examples of IMFSs, according to some embodiments;

FIG. 10A to 10C show possible three dimensional orientations of the positioning device; and FIG. 11 illustrates an apparatus according to an embodiment.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In order to enable positioning or location tracking, a radio frequency (RF) and/or GPS based location discovery and/or tracking is known. The GPS location discovery may not, however, be suitable for indoors due to lack of satellite reception coverage. Also the RF based location discovery and location tracking may only be possible by determining the indoor base station to which the user device is connected to, a round trip time of the RF signal, or the power of the received RF signal, for example. This type of location tracking may suffer from a lack of accuracy, for example, when the user gets located by two different RF base stations. Also, the coverage area of one base station may be wide resulting in poor accuracy. And, the building for which the RF-based location tracking is applied needs to be equipped with such base stations. Some other known positioning measures, which may be applicable indoors, include machine vision, motion sensor and distance measuring, for example. However, each of these requires expensive measuring devices and equipment mounted throughout the building.

As a further option, the utilization of Earth's magnetic field (EMF) may be applied. The material used for constructing the building may affect the EMF measurable in the building and also the EMF surrounding the building. For example, steel, reinforced concrete, and electrical systems may affect the EMF. The EMF may vary significantly between different locations in the building and may therefore enable accurate location discovery and tracking inside the building based on the EMF local deviations inside the building. On the other hand, the equipment placed in a certain location in the building may not affect the EMF significantly compared to the effect caused by the building material, etc. Therefore, even if the layout and/or amount of equipment and/or furniture, etc., change, the measured EMF may not change significantly.

Figure 1:
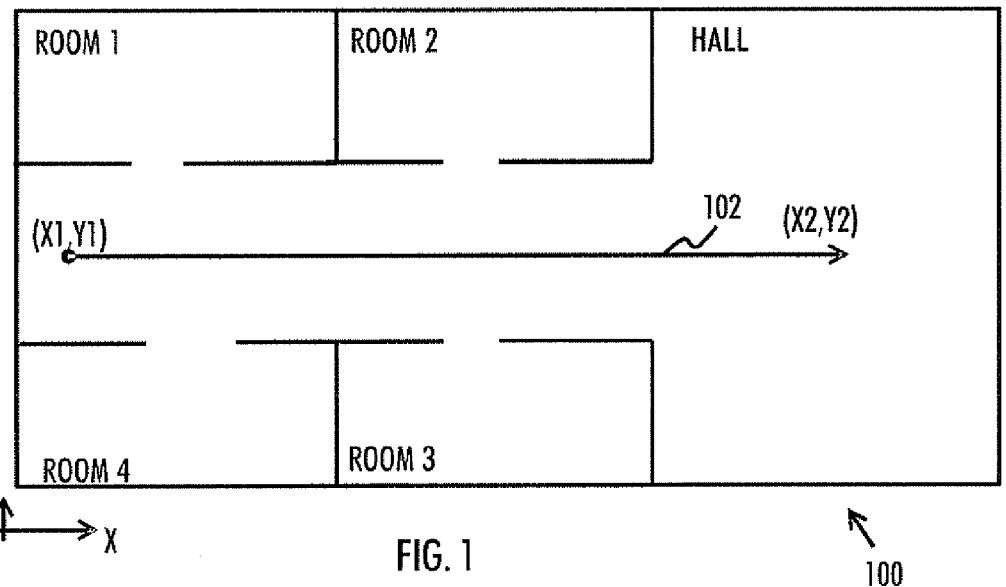

An example building 100 with 4 rooms, a corridor and a hall is depicted in FIG. 1. It is to be noted that the embodiments of the invention are also applicable to other type of buildings, including multi-floor buildings. The floor plan of the building 100 may be represented in a certain frame of reference. A frame of reference may refer to a coordinate system or set of axes within which the position, orientation, etc. are measured, for example. Such a frame of reference of the building in the example of FIG. 1 may be an XY coordinate system. The coordinate system of the building 100 may also be three dimensional when vertical dimension needs to be taken into account. The vertical dimension may be referred with Z, whereas X and Y together define a horizontal two-dimensional point (X,Y). In FIG. 1, the arrow starting at a point (X1, Y1) and ending at a point (X2, Y2) may be seen as a path 102 traversed by a user associated with an EMF positioning device. The Z dimension is omitted for simplicity.

The positioning device may comprise a magnetometer or any other sensor capable of measuring the EMF, such as a Hall sensor or a digital compass. The magnetometer may comprise at least one orthogonal measuring axis. However, in an embodiment, the magnetometer may comprise three-dimensional measuring capabilities. Yet in one embodiment, the magnetometer may be a group magnetometer, or a magnetometer array which provides magnetic field observation simultaneously from multiple locations spaced apart. The magnetometer may be highly accurate sensor and even small variations in the EMF may be noticed. In addition to the strength, also known as magnitude, intensity or density, of the magnetic field (flux), the magnetometer may be capable of determining a three-dimensional direction of a measured EMF vector. To this end, it should be noted that at any location, the Earth's magnetic field can be represented by a three-dimensional vector. Let us assume that a compass needle is tied at one end to a string such that the needle may rotate in any direction. The direction the needle points, is the direction of the Earth's magnetic field vector.

Figure 2A:
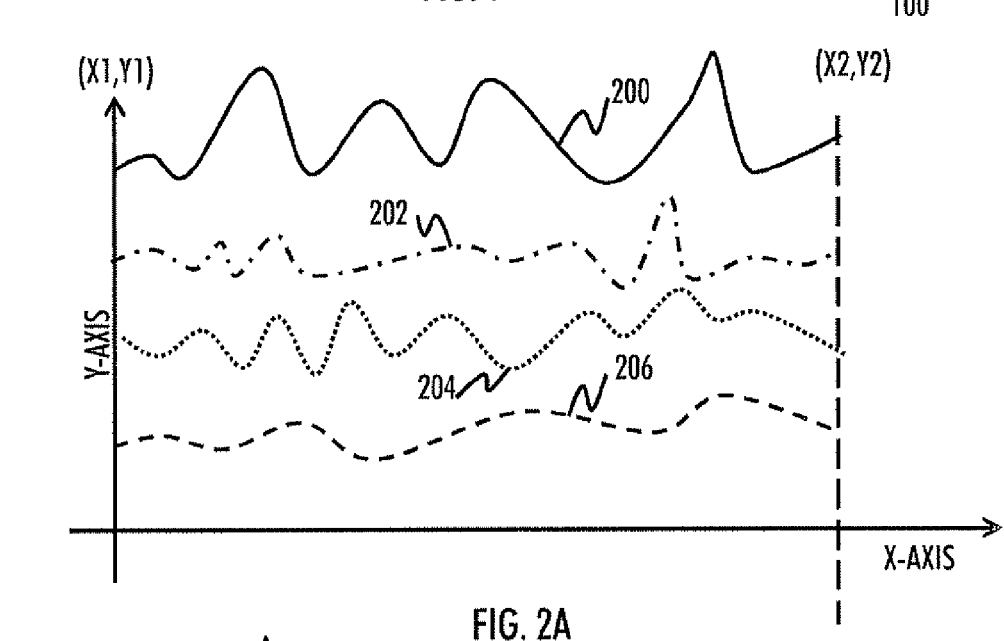
FIGS. 2A to 2C show an example of an indoor magnetic field sequence, IMFS, and a portable device oriented three-dimensionally.
Figure 2B:
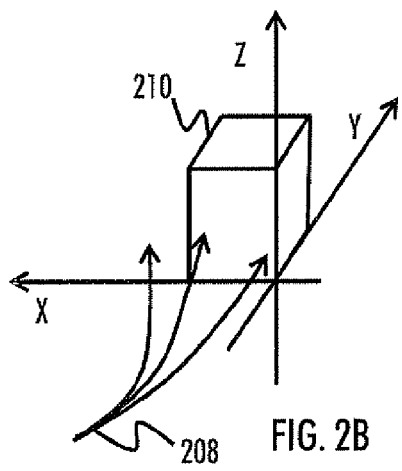
Figure 2C:
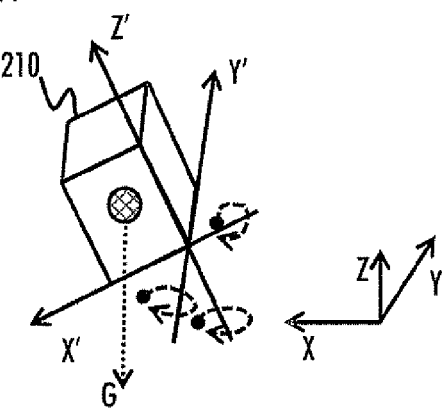

As said, the magnetometer carried by a person traversing the path 102 in FIG. 1 is capable of determining the three-dimensional magnetic field vector. Example three components of the EMF vector as well as the total strength are shown in FIG. 2A throughout the path 102 from (X1, Y1) to (X2, Y2). The solid line 200 may represent the total strength or magnitude of the magnetic field vectors and the three other lines 202 to 206 may represent the three components of the three dimensional magnetic field vectors. For example, the dot-dashed line 202 may represent the Z component (vertical component), the dotted line 204 may represent the X component, and the dashed line 206 may represent the Y component. From this information, the magnitude and direction of the measured magnetic field vector may be extracted. FIG. 2B shows how the Earth's magnetic field 208 may be present at the location of a portable device 210. In FIG. 2B, the portable device 210 is oriented in the three-dimensional space (XYZ) according to the frame of reference of the building, or in any predefined frame of reference. However, typically the object is moving and the three-dimensional orientation of the portable device 210 may vary from the predefined frame of reference as shown in FIG. 2C. In this case, the three-dimensional frame of reference is not according to the building, for example, but for the portable device 210, such as for the positioning device. Such frame of reference may be denoted with X', Y', and Z' corresponding to rotated X, Y, and Z of the world coordinate system. The G vector in FIG. 2C denotes the gravitational force experienced by the portable device 210.

In location tracking of the user or any target object moving in the building 100, the EMF vector measured by the portable device 210 carried by a person is typically compared to existing information, wherein the information may comprise EMF vector strength and direction in several locations within the building 100. The information may depict an indoor Earth's magnetic field map, such as a map for the magnitudes or the directions of the EMF vector in any given location inside the building. This way, the exact location of the person within the building is obtained. However, when such map is not available, tracking movements of the portable device 210 within the building is not possible in the above described manner.

Figure 3:
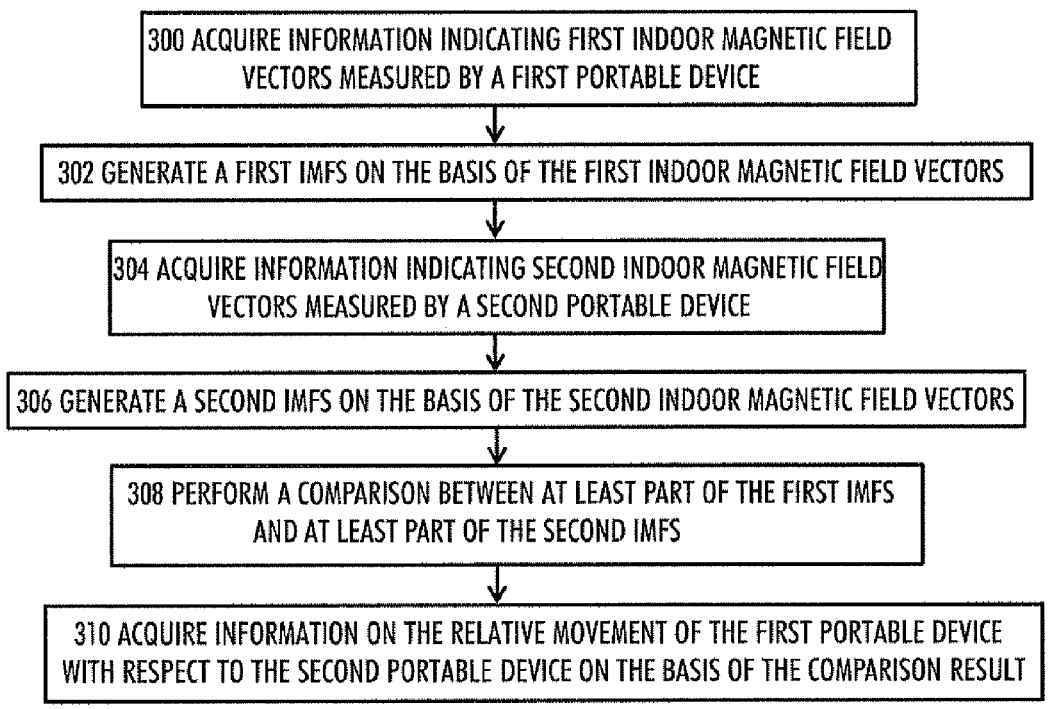
FIG. 3 shows a method according to an embodiment.
Figure 4A:
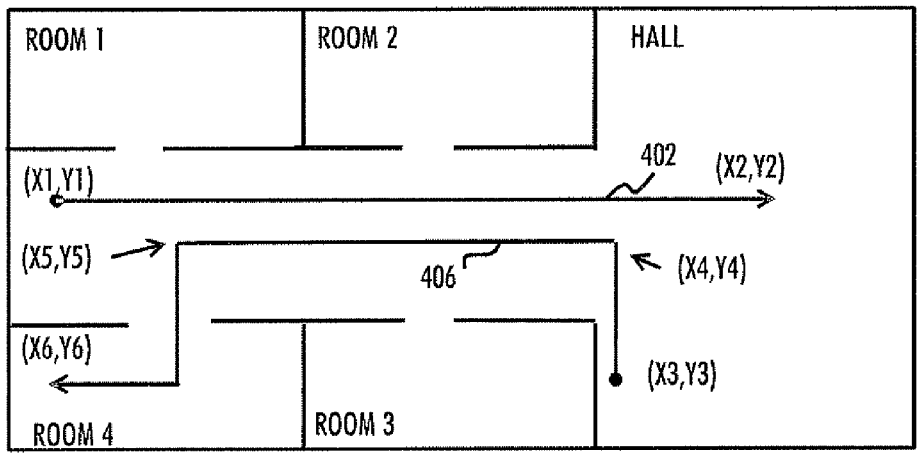
FIGS. 4A and 4B illustrate how portable devices move in the building, according to some embodiments.

At least partly for this reason, an apparatus and a method are provided for acquiring information about relative movements of devices indoors. The method is shown in FIG. 3, according to which the apparatus, such as a server, is caused, in step 301, to acquire information indicating first indoor magnetic field vectors measured by a first portable device inside the building 100. The first portable device (PD) may a device 400 travelling the path 402 from (X1, Y1) to (X2, Y2) in FIGS. 4A and 4B, for example. The indoor magnetic field vector may be caused by the Earth's magnetic field 208 affected by the structures of the building 100. As said, the PD 400 may measure the magnetic field vector by applying a magnetometer, for example. In step 302, the server may generate a first indoor magnetic field sequence (IMFS) on the basis of the first indoor magnetic field vectors. Generation of the first IMFS may denote placing the acquired first indoor magnetic field vectors, or a predetermined parameter related to those, in a sequence according to a predetermined criterion. The way how the IMFS are generated and what they contain are detailed later.

Similarly, in steps 304 and 306, the server may acquire information indicating second indoor magnetic field vectors measured by a second portable device (PD) inside the building 100, and generate a second IMFS on the basis of the second indoor magnetic field vectors. It is to be noted that the second PD is different than the first PD. The second PD may a device 404 travelling a path 406 from (X3, Y3) to (X6, Y6) in FIGS. 4A and 48, for example.

Figure 4B:
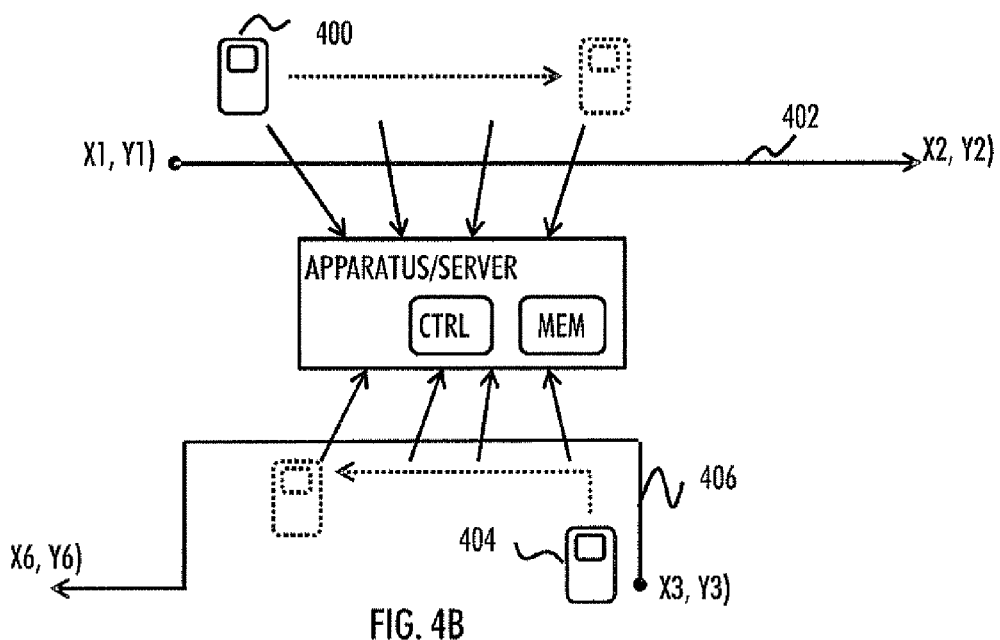

In an embodiment, the server may receive information on the measured EMF 208 from the two PDs 400, 404 wirelessly by applying, for example, the air interface of the UMTS terrestrial radio access network (UTRAN, 3G) or of the evolved UTRAN (LTE Advanced, 4G). As shown in FIG. 4B, the server may receive updates of the measured EMF 208 constantly from the PDs 400 and 404 travelling in the building 100, as shown with solid arrows. Alternatively, the PDs 400 and 404 may be required to indicate the measured EMF vectors according to a predetermined interval. It may also be that the server first generates the first IMFS and subsequently starts acquiring data for the second IMFS generation. In this case, the PDs 400 and 404 may move at different times in the building 100. Even though the description mainly discusses the first PD 400 and the second PD 404, it is clear to a skilled person that the same proposal may be applied for several PDs.

As described, in an embodiment, the apparatus may be seen as part of a database entity or the server, for example. In other words, the apparatus may be comprised in a central unit with which the PDs communicate when applying the proposed method. In another embodiment, the apparatus may be seen as one of the PDs. In this case, the apparatus itself determines (acquires) and generates the first IMFS, and receives (acquires) the information needed to generate the second IMFS. However, for the sake of simplicity let us assume the apparatus comprises or is the server.

The first and the second IMFSs may represent at least one of the magnitude and the direction of the Earth's magnetic field 208 inside the building 100. This may be advantageous because having information on both, the magnitude and the direction, may allow for more accurate movement determination, as will be explained later. On the other hand, the application of the magnitude only allows to disregard the three dimensional orientation of the PDs and, thus, less complex calculations. Thus, in an embodiment, the IMFS may be seen as one of the curves 200 to 206 in FIG. 2A. For example, the IMFS may comprise values and, thus a waveform, corresponding to the curve 200, at least when the purpose of the IMFS is to show the magnitude of the measured indoor magnetic field vectors. In an embodiment, the IMFSs may show a three-dimensional direction of the measured EMF 208, wherein the three-dimensional direction is calculated from the acquired XYZ-directions.

Figure 5A:
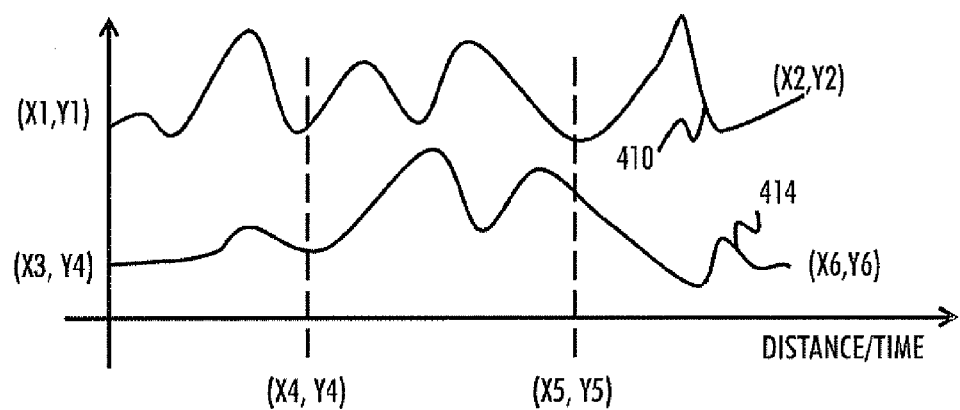
FIGS. 5A to 7A illustrate examples of IMFSs, according to some embodiments.

Let us take a look at FIG. 5A. The Figure shows two generated IMFSs 410 and 414, wherein the IMFS 410 corresponds to the PD 400 and to the path 402 traversed, and the IMFS 414 corresponds to the PD 404 and to the path 406 traversed. The IMFSs 410 and 414 may be seen to depict the total magnitude of the measured EMF 208 (thus corresponding to the curve 200 of FIG. 2A), for example. Alternatively, the IMFS could depict the magnitude in any of the XYZ directions, or the direction of the EMF vectors 208, for example. However, for the sake of simplicity, let us assume now that the generated IMFSs depict the total magnitude of the indoor magnetic field vectors measured by the PDs 400 and 404. It should be noted that the IMFSs 410 and 414, although being sequences, may be illustrated in a form of a curve, as in FIG. 5A, and, thus, each IMFS may have its own waveform. An alternative manner to illustrate the IMFS 410 and 414 may be to represent the IMFS 410 and 414 as vectors with a certain number of numerical elements. However, a skilled person will readily acknowledge that any vector may be plotted as a curve with a certain waveform. Thus, for the simplicity, the description discusses the IMFSs as curves.

In step 308 of FIG. 3, the server performs a comparison, e.g. by applying dynamic programming based algorithms, between at least part of the first IMFS 410 and at least part of the second IMFS 414. The comparison may comprise comparing the waveforms of the sequences, the numerically represented vectors of the sequences, etc. The comparison may be made between the complete IMFS, which may be of same or different lengths. For example, the server may have generated the first sequence based on vectors acquired from the PD 400. The first IMFS 410 may have been generated for example one hour ago when the PD 400 traveled along the path the path 402. Subsequently, the server may start to acquire data from the second PD 404, and thus to generate the second IMFS 414. The server may compare the second IMFS 414, which may be constantly updated, with the complete first IMFS 410. In an embodiment, when the second IMFS 414 is shorter in length than the first sequence 410, the server may compare the second sequence 414 with several portions of the first sequence 410 in a sliding window manner, and/or by applying dynamic programming based algorithms, e.g., to find the longest common subsequence, for example.

In an embodiment, the server compares IMFS 410 and 414 which are being generated simultaneously. That is, it may be assumed that the PDs 400 and 404 travel their own paths substantially simultaneously and the server acquires the data indicating the measured indoor EMF vectors substantially simultaneously. Then, the server may compare the generated IMFS 410 and 414. When the server detects, for example, similarities in the sequences 410, 414 which exceed a predetermined, possibly empirically derived, threshold, the server may act in a known manner, as will be explained later.

Figure 6:
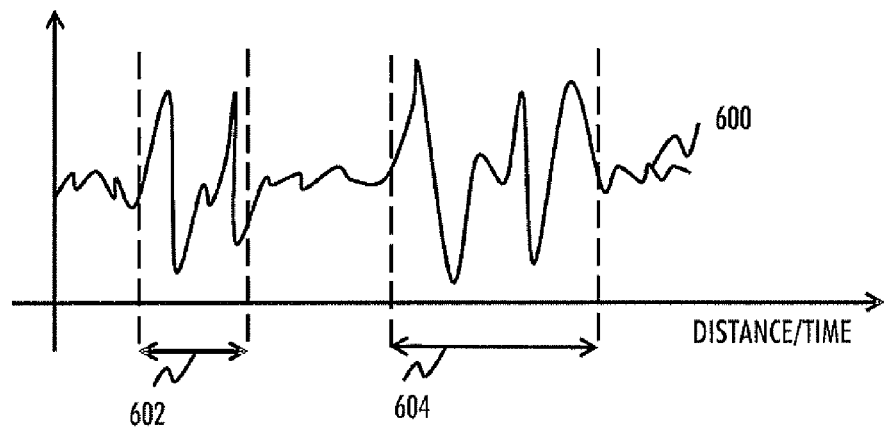

In an embodiment, however, the step of comparison may be preceded by a step where the server, as shown in FIG. 6, detects variations exceeding a predetermined threshold in a generated first IMFS 600 and in a second IMFS. FIG. 6 shows only the first sequence 600 for simplicity. It may be seen that in the portions 602 and 604, the waveform of the first sequence 600 shows rapid variations. There may be, for example, an empirically derived threshold which the variations need to exceed in order to be selected. The threshold may refer to the peak to peak amplitude, how much the values in the sequence have spread, etc. I.e. the server may select salient parts from the IMFS 600. The server may then apply only those parts, i.e. subsequences, of the first IMFS 600 and of the second IMFS that exceed the predetermined threshold in the comparison. In the example of FIG. 6, only the portions (subsequences) 602 and 604 of the sequence 600 would be used for the comparison. This selection of representative, salient features may be advantageous to reduce the amount of data which need to be compared and/or to decrease the probability of erroneous comparison results may be decreased. This is because comparison between two sequences, each having only small variations (such as below the empirically defined threshold), may not be as accurate as a comparison between two sequences with high variations.

If the second PD 404 has been moving more slowly or faster than the first PD 400, dynamic programming approaches may be applied, such as dynamic time warping, for example. The dynamic time warping is a technique known by a skilled person for measuring the similarity of two sequences (or subsequences) 410 and 414 which may be compared to each other.

Based on the comparison result, the server may in step 310 acquire information on the relative movement of the first PD 400 with respect to the second PD 404 inside the building 100. The relative movement of the first PD 400 with respect to the second PD 404 may indicate that the PDs (and possibly the persons associated with the PDs, as will be explained later) have been moving in the same areas of the building 100 or in different areas in the building 100. Thus, the exact location within the building is not acquired nor is it needed. The comparison may not allow us to know is the person currently in the hall of the building 100, for example. However, it may be of importance to "blindly" detect characterizing features related to the behavior of the people inside the building 100. By comparing these characterizing features which associate the IMFSs to the movements of the portable devices, such knowledge of the relative movements of the devices 400/404 may be obtained, at least on some level. Let us take a closer look at how the information regarding the relative movement is obtained.

In an embodiment, the comparison result may lead to acquisition of at least one statistical property between the first and the second IMFSs 410 and 414. An example statistical property may be a correlation between the sequences 410 and 414. As known, the correlation indicates similarity between the two sequences, and thus gives an indicator on whether the two PDs 400 and 404 have been moving along the same or different paths, for example. This is because if people have been moving in the same areas, they most likely provide similar indoor magnetic field sequences. If they have been moving in different areas, they most likely provide different indoor magnetic field sequences.

In an embodiment, the server may determine that the first PD 400 and the second PD 404 have been moving along the same path upon detecting, based on the comparison, that the first IMFS 410 and the second IMFS 414 fulfill a predetermined criterion with respect to similarity. Such predetermined criterion may refer to an empirically derived amount of correlation between the sequences 410 and 414, for example. Alternative or additional criterion may comprise similarity in the maximum peak-to-peak amplitudes, frequency of certain identified sequence (or waveform) portions (i.e. subsequences), likelihood that a second sequence (or a sub-sequence) is generated from the first sequence, longest common sub sequence, etc. The likelihood may be obtained with predefined algorithms and the likelihood implies how probable it is that at least part of the first IMFS 410 is generated at the same location/path as at least part of the second IMFS 414. In an embodiment, the server may compare the waveforms of the IMFS 410 and 414 and detect that the waveforms are similar at least in one portion of the sequences. This may imply that the PDs 400 and 404 corresponding to the IMFSs 410 and 414 have been travelling at least partly the same path in the building 100.

Figure 5B:
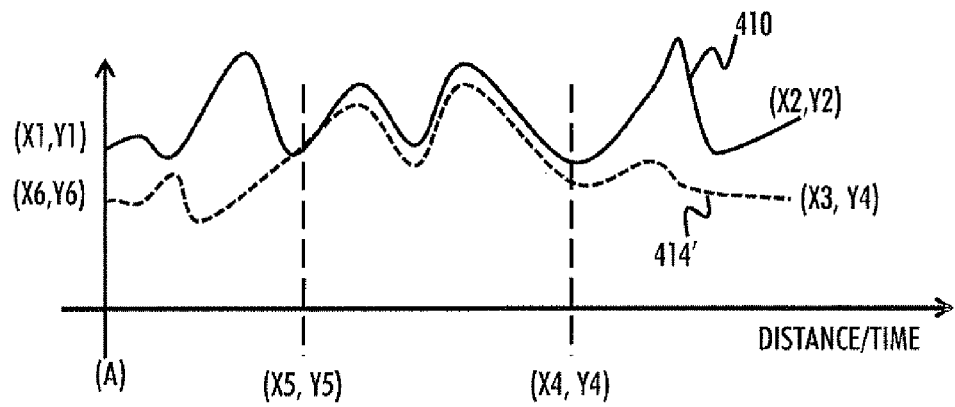

In an embodiment, the server, when performing the comparison, may detect that at least part of the second sequence 414 is a mirror image of at least part of the first sequence 410. In this case, the server may determine that the first PD 400 and the second PD 404 have been moving in opposite directions along the same path. In other words, the server may detect, based on the comparison, that the first IMFS 410 and a mirror image of the second IMFS 414 fulfill a predetermined criterion with respect to similarity. This is shown in FIGS. 5A and 5B. The server may detect that the waveforms in FIG. 5A are at least partly mirror images of each other. Thus, the server may compare the first IMFS 410 and the mirror image 414' of the second IMFS 414, as shown in FIG. 5B. It may be seen that these two sequences 410 and 414' are substantially identical in the portion between the vertical dashed lines. From this it may be deduced that the first PD 400 and the second PD 404 have been moving along the same path, in opposite directions, at parts of their paths 402 and 406.

In an embodiment, information on the relative speeds of the PDs 400 and 404 may be acquired on the basis of the comparison. For example, when the IMFS 410 and 414 are scaled differently with respect to X-axis (such as with respect to time), but show similar characteristics (although in different scale), then it may be detected that the first PD 400 has been moving faster/slower than the second PD 400. It may be advantageous to acquire such information, because it may enable characterizing the PDs 400/404 (and possibly the persons associated with them) as a function of speed. This may be possible at least on some level, such as by detecting that "PD 400 is typically moving faster/slower than PD 404". This may allow the server to determine the scale on the X-axis more quickly and more accurately for each identified PD 400/404. For example, if it is detected that the PD 400 is typically moving faster than the PD 404, the server may apply different scale on the X-axis for the PD 400 than for the PD 404. The scale of the X-axis may refer to how many EMF vectors (e.g. samples in the IMFS) the PD 400 provides during a path of certain length. When travelling faster, the number of samples is not as high as when travelling slower.

Further, the relative speed information may indicate how busy a person associated with the corresponding PD is, or is the person carrying the corresponding PD a child or an adult, for example. Further, in an embodiment, upon detecting that there is variety between several different IMFSs with respect to the scale of the X-axis (such as tens of IMFSs), it may be determined the location, which is characterized by the IMFS, is a location having a dynamic nature with respect to movements in the location. Such location may be an entry hall of a building, i.e. a place which is passed by often.

It is to be noted that FIGS. 5A and 5B, or other Figures in the application showing example IMFSs, are not in scale in the vertical dimension. E.g. the location of the second IMFS 414 or 414' is not in scale to the location of the first IMFS 410.

Let us take a look at another embodiment shown in FIGS. 7A and 7B. In this embodiment, the server may decide to characterize a certain path, such as a path 702, which a first PD 700 has traversed, with a first IMFS 710. The characterizing feature of the path 702 may be the waveform of the first sequence 710. The server may further identify a specific portion 708 of the first IMFS 710. The specific portion 708 may be selected randomly, or because it has a well-defined, salient form/appearance in the waveform 710 in a statistical sense (e.g. high variance). Thus, this identified portion 708 of the IMFS 710 may work as a fingerprint of the path 702. Thereafter, the server may detect, based on a comparison between the first IMFS 710 and a second generated IMFS 714, corresponding to another PD 704, whether or not the second IMFS 714 comprises substantially the same specific portion 708 as the first IMFS 710. Here it may be detected that the portion 708 of the first IMFS 710 is the same or at least substantially the same as the portion 709 of the second IMFS 714. I.e. the waveform portions 708 and 709 of the IMFS 710 and 714 may have required amount of similarity (e.g. correlation is high enough). This may drive the server to determine that the second portable device 704 is or has been at a same location 712 in the building 100 as the first portable device 700. I.e. even though the server may not know what the location 712 is in the building (a hall, a room, a corridor, etc.), the server may know that both devices 700 and 704 have been in that location. Such determination may be important as it may allow the server to associate these two portable devices and their owners together, at least at some level.

As said, the second PD 704 may transmit information 716 related to the measured indoor magnetic field vectors to the server, as shown in FIG. 7B. The server may generate and update the second IMFS 714 based on the received magnetic field vectors 716. It may be that the second PD 706 travelling the path 706 provides data to the server and the server may update the second IMFS 714 each time the server receives a new magnetic field vector indication 716 from the second PD 704. By comparing the specific portion 708 of the first sequence to the updated second sequence 714, the server may at some point detect that the same "fingerprint" 708/709 is present in the second IMFS 714 as well. In an embodiment, the server may, after having detected that the second IMFS 714 comprises the specific portion 708/709, cause a transmission of a location sensitive message 718 to the second portable device 714. The location sensitive message 718 comprises information related to the location 712 which is characterized by the specific portion 708/709. As said, the server may not know what or where the location is in the building. However, the location sensitive message 718 may be, for example, something in the lines of "the first PD 700 (belonging to the person X) is/was in this location Y (minutes ago/now)". Thus, the message 718 may serve as information piece to the recipient regarding who has been in the same location, for example.

In an embodiment, the server may associate each portable device with a specific person. In an embodiment, the identity of the person may be acquired by identifying the person based on which portable device provides the magnetic field vectors. For example, it may be that a certain device is associated with a certain user in a database of a work group, for example. The server may access the work group's database and, consequently, obtain the identity information. The PD may need to inform its identity code prior to transmission of magnetic field vectors, for example.

In an embodiment, the identity is acquired based on sign-in procedure. That is, the portable device may need to be checked-in/logged-in before the PD may start providing data to the server. In an embodiment, the PD needs to be checked-in to a registered account of a social network service before the portable device is allowed to provide magnetic field vectors to the server. Thus, the check-in to the server may take place through a social network service account. This may be advantageous so that the information in the social network service regarding the person may be readily used. For example, the friends of the person may be identified based on the Facebook® social network service, and when the second portable device 704 is detected to belong to a friend of the owner of the first PD 700, the location sensitive message 718 may indicate this in the following exemplary manner "Hi James, it seems that you are in the same neighborhood as I am. Would you like to meet?". Thus, the server may include the identity of the specific person in the location sensitive message, such as in the message 718.

In an embodiment, the server may generate several IMFSs based on acquired indoor magnetic field vectors from several portable devices. In other words, the server may generate for example, tens of sequences. The server may identify a specific portion, such as the portion 708, which is present in a number of the IMFSs, wherein the number exceeds a predetermined threshold. Again, the threshold may be empirically derived, for example. The specific portion of the IMFS may be short in length, such as only a rapid increase in the amplitude, or it may be long in length, such as several peaks in the IMFS. Thereafter, the server may consider the identified specific portion to be a characterizing feature related to a popular location inside the building 100. For example, it may be assumed that many persons travel through the hall of the building 100. As a consequence, the many IMFS may have the same specific portion, such as a specific waveform portion, which is based on the indoor magnetic field vectors measured by the PD when the person carrying the PD is in the hall. Therefore, even by not knowing that the location characterized by the specific portion is a hall, the server may know that the location is popular among the people in the building because a vast number of people are associated with an IMFS having the same "fingerprint".

In an embodiment, the server may detect that a subsequently generated third IMFS, corresponding to acquired indoor magnetic field vectors from a third portable device, comprises the identified specific portion (such as a specific waveform portion). Subsequently, the server may cause a transmission of a location sensitive message to the third portable device. The location specific message may comprise, for example, adds or alike. In an embodiment, the location specific message may comprise a question, such as "Is there an elevator (or any other densely populated location) in your current location?". If the third PD replies as "Yes", the server may subsequently offer services related to the populated location.

In an embodiment, let us assume that the popular location is an elevator. This is shown in FIG. 8. Let us assume that in front of an elevator 800 there is a corridor 802. The detected specific portion of the IMFS may comprise the waveform 804 or parts of it. For example, if the location is an elevator, the server may, upon detecting that a portable device is at or is approaching the location, transmit a message to the PD as shown by the arrow 810. The server may detect the presence of the device by examining the IMFS corresponding to the device. When the server detects the specific portion 804, or at least a part of the specific portion 804, in the generated IMFS related to the PD, the server may determine that the PD is in the location characterized by the portion 804. The message may read in the lines of: "Would you like to order the elevator to your floor?". This may be advantageous so that the person need not wait for the elevator to come, for example. It should be noted that, for example, in the case of an elevator, the popular location characterized by the specific waveform portion, may comprise the corridor 802 or hall in front of the elevator 800, i.e. the specific location need not be one specific corner in the corridor, but it may be a longer portion. Thus, the server may detect the person approaching the elevator 800 well before the person actually reaches the elevator 800. For example, the IMFSs 806 and 808 generated when the person is in either of the other two corridors 807 and 809 shown in FIG. 8 may not be considered as characterizing portions for a popular location because these corridors 807 and 809 are not traveled as often as the corridor 802 is. As soon as the person is at the corridor 802, the server may detect that the person is providing IMFS comprising parts of the specific portion 804. Therefore, the server may determine that the PD is in the popular location which is, in this example case, associated with the elevator 800.

In an embodiment, the magnetic field vectors used for generating the first IMFS and the second IMFS may be time stamped, thereby enabling the generation of the IMFSs with respect to time domain. This way the apparatus may acquire spatiotemporal information on the relative movement of the first portable device 400 with respect to the second portable device 404. As also time domain information is obtained in addition to the spatial movement information, it may be said that spatiotemporal information is obtained on the relative movement of the first portable device 400 with respect to the second portable device 404. It may be determined, for example, that the PDs 400, 404 have been in the same place substantially at the same time or at different times. Such information may be included in the location specific message, for example. In an alternative embodiment, the vectors are not time stamped, so that there may not be any way of knowing the respective times when the two PDs (and persons associated with PDs) have traveled in the building 100.

In an embodiment, the server may detect a group of portable devices (and, possibly, a group of identified people carrying the PDs), which are moving at the same time along the same path, based on the comparison result and the time domain information. The server may follow the individual movements in the group, such as a PD (associated to a certain person) leaving the group or the group breaks apart. The server may also detect if a new portable device (possibly associated to a certain individual) starts to follow the group, e.g. joins the group.

In an embodiment, it may also be detected, when time domain information is available, that at least one PD is following another PD or a group of PDs. This may be communicated to the leading PD/PDs in order to let the leading PD/PDs (and the persons associated) to know that there is someone behind. This may be advantageous so that the person/persons associated with the leading PD/PDs may decide whether or not to wait for the person behind. It should be noted that the identity of the following at least one PD may be indicated to the leaders, so that the leading persons may decide whether the person behind is a friend or a foe, such as some unwanted person, for example.

In an embodiment, the server acquires information on the topology of the building (100) on the basis of detecting that parts of the first and second IMFSs are the same and parts of the first and second IMFSs are different. The similarity and difference between the IMFS may be detected from the waveforms, for example. Let us take a look at FIG. 9A which depicts the IMFSs 410 and 414' relating to PDs 400 and 404 travelling in the building 100 of FIG. 4A. It may be detected that the part between coordinates (X4, Y4) and (X5, Y5) is substantially similar in both IMFSs 410 and 414', whereas the parts before and after the similar part are different in the two sequences 410, 414'. Based on such detection, the server may consider the specific portion of the IMFSs 410, 414' before or after which the first and the second IMFS 410, 414' are different to characterize a location of an intersection in the building 100. Such specific portion before or after which IMFS are different, may be at least one of the edges 900 and/or 902 of the portion between coordinates (X4, Y4) and (X5, Y5). For example, the edge part 900 may be considered to characterize an intersection in the building 100. The intersection may refer to the point (X5, Y5) in the building 100 of FIG. 4A. The edge part 902 may be considered to characterize an intersection in the building 100. The intersection may refer to the point (X4, Y4) in the building 100 of FIG. 4A. The server may further associate the intersection (X4, Y4) to the intersection (X5, Y5) in the building 100. This is because it is clear that PDs 400 and 404 have been able to travel a path between the two intersections. This way the topology of the building may be acquired at least on some level.

In an embodiment, the server acquires information about the velocity of movement of the portable devices 400, 404 based on inertial sensors, such as accelerometer, carried by the portable devices 400, 404. Such information may allow the server to detect the distance between the two intersections (X4, Y4) and (X5, Y5), based on number of steps detected, for example. This may be advantageous so that the server may build a map of the building 100.

In an embodiment, the first IMFS 410 may be compared to a plurality of other IMFSs, such as to a second IMFS 914 and to a third IMFS 916 of FIG. 9B. The first IMFS may have been generated previously, such as a day ago, for example. The server uses the IMFS of the first PD to characterize the paths traveled by the first PD. Later on, let us assume that a second and a third portable devices travel in the same building. It may be, based on the comparison, that the server determines that the second portable device, associated with the second IMFS 914, is moving at least partially along the same path as the first portable device. It may also be detected, based on the comparison, that the second portable device moves in the same direction as the first portable device. Moreover, the server may detect that the third portable device, corresponding to the third generated IMFS 916, is moving in an opposite direction along the same path as the first portable device. In other words, the persons associated with the second and third devices are going to meet soon at a location 918 shown with dotted line. The directions of movement are shown with arrows in FIG. 9B. Thus, the time domain information may be applied as well so that it is known that the second and the third portable devices are moving in the building at the same time. Thus, the server may determine that the second portable device and the third portable device will converge on their paths at the location 918. It is to be noted that the exact location in the building is not necessarily known, only that the location 918 is characterized by a waveform portion 920. Such knowledge may enable the server to send messaged to the second and to the third portable devices, such as "I will soon be in your location, would you like to discuss on some issues?", etc.

In an embodiment, the X-axis in FIGS. 5-7 and 9, represents the order in which the indicated magnetic field vectors are acquired. In an embodiment, the X-axis in FIGS. 5-7 and 9, represents time domain information. However, in an embodiment, the X-axis in FIGS. 5-7 and 9, represents distance moved by the PD. The motion estimate needed for the distance representation may be acquired from at least one motion sensor coupled to the PD. The motion sensor may be comprised in an inertial measurement unit (IMU). The motion sensor may comprise for example at least one acceleration sensor or an odometer. The motion sensor may detect the movement of the PD and provide as output an estimate of the movement. The estimate may comprise at least the amount of movement, i.e. for example, how many meters the PD has moved and/or how many steps the person carrying the PD has taken. In addition, the direction of the movement may be determined by the motion sensor. The distance information obtained may be used to pair the measured EMF values, and hence, the generated IMFSs to a distance. Thus, it is possible to represent the IMFSs as a function of distance with respect to the motion of the PD. This may be beneficial for the comparison of two IMFSs. For example, the second sequence 410 in FIG. 5A may be based on measurements by a rapidly moving PD, whereas the second IMFS 414 corresponds to s lowly moving PD. Nevertheless, both sequences may be plotted in the distance domain. To put it differently, even if the person with the PD 400 providing the first sequence 410 has stopped at some point along the path, the first sequence 410 in the distance domain may still be directly comparable to the second sequence 414.

It should be noted though that knowing the map of the building is neither required nor necessary for the application of the different embodiments. In fact, in an embodiment, the locations of the first portable device 400 and the second portable device 404 relative to the building 100 are unknown and a magnetic field map of the building 100 is not applied.

However, it may be important to locate the portable device in some specific building, i.e. not necessarily with respect to the building itself, but advantageously with respect to other buildings. This may be important so that two portable devices, which are travelling in different buildings, possibly in different cities or even different countries, and providing similar IMFSs, are not considered to be in the same location in the same building. It should be noted that two different buildings may provide similar Earth's magnetic field vectors. For example, imagine two substantially identical sky scrapers locating next to each other and having office facilities. It may be that PD #1 travelling in the building #1 may provide an IMFS similar than a second PD#2 travelling in the building #2.

In order to avoid mistakes of this type, in an embodiment, the server may acquire information indicating the geographical location of the portable devices, wherein the geographical location is based on at least one of the following techniques: a radio frequency based location, a global positioning system (GPS). For example, the GPS information of the portable device may indicate where the PD is located and thus the building it has or will entered. The GPS data may be acquired prior to the portable device entering the building. However, the radio frequency based location discovery may allow the server to locate the portable device within a specific building, even after the PD has entered the building. Any other location discovery technique known by a skilled person may be applied for this data acquisition. Thereafter, the server may determine the building 100 or any geographical area, among a plurality of buildings/geographical area, in which the portable device/s is/are on the basis of the indication of the geographical location.

As said with reference to FIG. 2C, the three dimensional orientation may not be the same with all of the devices. This may make is difficult to apply the information about the direction of the measured magnetic fields. It should be noted that although observing the magnitude may in be sufficient, observing the direction may provide additional accuracy and efficiency. This is because more information, including the direction, may be utilized. In other words, applying the direction information instead or in addition to the magnitude information may make the proposed solution more accurate. For example, let us assume that each portable device is associated with at least two different IMFSs. For example, one IMFS may depict the EMF magnitude measured by the PD and the other IMFS may depict the measured direction of the EMF. Both of these sequences may be compared to the respective sequences of another portable device. When both of the comparisons (the magnitude comparison and the direction comparison) show similarities of required amount, it may be determined that these two PDs have been walking at least partly the same paths in the building. Thus, this is more accurate than when comparing only the magnitude or only the direction.

However, a person carrying the first portable device 400 may not all the time keep the device 400 in the same angles as the second user with the second portable device 404. In particular, the portable device 400 may be, independently of the other PD 404, rotated about at least one of the three axes X, Y and Z, as shown in FIG. 2C. This may lead to differences in the provided EMF directions by the two PDS 400 and 404 even though walking the same path. Therefore, in order to obtain the direction information regardless of the orientation of the portable devices, the server may acquire information indicating a three-dimensional orientation of the first and/or second portable device at the at least one time instant when the magnetic field vector is measured. Such information may be acquired from the portable devices which comprise an acceleration sensor, a gyroscope, or alike.

However, the acquired (X', Y', Z') information may not be the same as (X, Y, Z). Thus, errors may occur without adjusting/rotating/correcting the acquired EMF vector from the frame of reference (X', Y', Z') of the positioning device 400 to the frame of reference (X, Y, Z). Therefore, the server may adjust the acquired magnetic field vector at least partly from the frame of reference (X', Y', Z') of the portable device to a predefined frame of reference (X, Y, Z). The adjustment may be made at least partly on the basis of the acquired information indicating the three-dimensional orientation (X', Y', Z') of the portable device 400/404. Let us look at how such adjustment may be made.

The three-dimensional orientation of the portable device 400/404 may be defined by at least one of the following: a rotation with respect to a first horizontal axis (such as X-axis or Y-axis), a rotation with respect to a second horizontal axis (such as Y-axis or X-axis, respectively), and a rotation with respect to a vertical axis Z. Let us consider this in more detail by referring to FIG. 10. In FIG. 10, the solid arrows represent the world XYZ coordinate system and the dotted lines show the frame of reference of the portable device 400/404. FIG. 10A shows how the portable device 400/404 may be rotated about Y-axis. For simplicity, it may be assumed that in FIG. 10, the X direction represents the direction from the point (X1, Y1)) to the point (X2, Y2) in FIG. 4A, for example. That is, in FIG. 10A, the Y-axis points towards the paper. In FIG. 108, the portable device 400/404 is rotated about X-axis, which points towards the paper. In order to determine the amount of rotation about the Y-axis (FIG. 10A) and about X-axis (FIG. 10B), the portable device 400/404 may be in one embodiment equipped with inertial measurement unit (IMU). The IMU may comprise at least one acceleration sensor utilizing a gravitational field. The IMU may optionally also comprise other inertial sensors, such as at least one gyroscope, for detecting angular velocities, for example. The acceleration sensor may be capable of detecting the gravitational force G. By detecting the acceleration component G caused by the Earth's gravitation in FIGS. 10A and 10B, the portable device 400/404 may be able to determine the amount of rotation about axis X and/or Y.

Although the rotation about the X and Y axis may in general be correctable because the global reference (the gravitational force G) is present, the rotation about the Z-axis as shown in FIG. 10C may not be corrected as easily. This may be due to lack of the global reference similar to G. Rotations relative to the Z axis may, nevertheless, be detected at some level by using the at least one gyroscope comprised in the IMU.

However, in case the rotation about the z-axis cannot be fully corrected, which may be due to the lack of a global reference, such as the G, it may still be advantageous to determine the magnitude of the XY-plane projection and the magnitude of the Z-component. As said, the rotations about the XY-plane may be corrected using the global reference G. Namely, the norm of the XY-plane projection $\|m\|_{xy}$ of the EMF vector m=(x,y,z) may be determined as $\|m\|_{xy}$=sqrt(x$^2$+y$^2$) even without adjusting the rotation about the Z-axis. As a result, the feature vector (z, $\|m\|_{xy}$) may be computed from the tilt compensated magnetic field observation, which feature vector is invariant to the rotation about the Z-axis. These two features enable for more EMF vector information than the magnitude alone, because the magnitude may be represented separately for the Z-axis component and for the XY-plane projection.

An embodiment, as shown in FIG. 11, provides an apparatus 1100, such as the server, comprising a control circuitry (CTRL) 1102, such as at least one processor, and at least one memory 1104 including a computer program code (PROG), wherein the at least one memory 1104 and the computer program code (PROG), are configured, with the at least one processor 1102, to cause the apparatus 1100 to carry out any one of the above-described processes. It should be noted that FIG. 1100 shows only the elements and functional entities required for understanding a processing system of the apparatus 1100. Other components have been omitted for reasons of simplicity. It is apparent to a person skilled in the art that the apparatus may also comprise other functions and structures.

As said, the apparatus may be or be comprised in a server located in a network, which network is accessible wirelessly, through a radio interface, for example. In another embodiment the apparatus is comprised in one of the portable devices, such as in the portable device 400. However, even regarding this embodiment the functional entities such as a magnetometer, is not illustrated for simplicity reasons.

As said, the apparatus 1100 may comprise a control circuitry 1102, e.g. a chip, a processor, a micro controller, or a combination of such circuitries causing the apparatus to perform any of the embodiments of the invention. The control circuitry 1102 may be implemented with a separate digital signal processor provided with suitable software embedded on a computer readable medium, or with a separate logic circuit, such as an application specific integrated circuit (ASIC). The control circuitry 1102 may comprise an interface, such as computer port, for providing communication capabilities. The memory 1104 may store software (PROG) executable by the at least one control circuitry 1102.

The control circuitry 1102 may comprise an IMFS generation circuitry 1110 for generating the indoor magnetic field sequences based on the measurements performed by the portable devices in the building. An analysis circuitry 1112 may be used for performing the comparison between different sequences and for acquiring information regarding the relative movements of the portable devices, such as whether or not they have been moving along the same path. The control circuitry 1102 may further comprise a messaging circuitry 1114 for communication of messages, such as location specific messages, to the portable devices when required according to any of the embodiments.

The apparatus 1100 may further comprise radio interface components (TRX) 1106 providing the apparatus with radio communication capabilities with the radio access network. The radio interface components 1106 may comprise standard well-known components such as amplifier, filter, frequency-converter, (de)modulator, and encoder/decoder circuitries and one or more antennas.

The apparatus 1100 may also comprise a user interface 1108 comprising, for example, at least one keypad, a microphone, a touch display, a display, a speaker, etc. The user interface 1108 may be used to control the apparatus 1100 by the user.

As said, the apparatus 1100 may comprise the memory 1104 connected to the control circuitry 1102. However, memory may also be integrated to the control circuitry 1102 and, thus, no memory 1104 may be required. The memory 1104 may be implemented using any suitable data storage technology, such as semiconductor based memory devices, flash memory, magnetic memory devices and systems, optical memory devices and systems, fixed memory and removable memory. The memory 1104 may be for storing information about the topology 1120 of the building, for storing data related to IDs 1122 of the persons associated with portable devices, for storing the generated indoor magnetic field sequences for a predetermined amount of time, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configure to carry out embodiments of any of the FIGS. 1 to 11. In an embodiment, the at least one processor 1102, the memory 1104, and the computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for acquiring information about relative movements of portable devices indoors, comprising:
   at least one processor and at least one memory including a computer program code,
   wherein the at least one memory and the computer program code are configured to, with the at least one processor, cause the apparatus at least to:
   acquire information indicating first indoor magnetic field vectors measured by a first portable device inside a building;
   generate a first indoor magnetic field sequence, IMFS, on the basis of the first indoor magnetic field vectors;
   acquire information indicating second indoor magnetic field vectors measured by a second portable device inside the building;
   generate a second IMFS on the basis of the second indoor magnetic field vectors, wherein the first and the second IMFS s represent at least one of the magnitude and the direction of the Earth's magnetic field;
   perform a comparison between at least part of the first IMFS and at least part of the second IMFS; and
   acquire information on the relative movement of the first portable device with respect to the second portable device inside the building on the basis of the comparison result, wherein, for the acquisition of the information on the relative movement, the locations of the first portable device and the second portable device relative to the building are unknown and a magnetic field map of the building is not applied.

2. The apparatus of claim 1, wherein the apparatus is further caused to:
acquire information on the relative speed of the first portable device with respect to the second portable device on the basis of the comparison result.

3. The apparatus of claim 1, wherein the apparatus is further caused to:
either determine that the first portable device and the second portable device have been moving along the same path upon detecting, based on the comparison, that the first IMFS and the second IMFS fulfill a predetermined criterion with respect to similarity, or
determine that the first portable device and the second portable device have been moving in opposite directions along the same path upon detecting, based on the comparison, that the first IMFS and a mirror image of the second IMFS fulfill a predetermined criterion with respect to similarity.

4. The apparatus of claim 1, wherein the apparatus is further caused to:
characterize a certain path, which the first portable device has traversed, with the first IMFS;
identify a specific portion of the first IMFS;
detect, based on the comparison, that the second IMFS comprises substantially the same specific portion as the first IMFS, thereby determining that the second portable device is or has been at a same location in the building as the first portable device; and
cause a transmission of a location sensitive message to the second portable device, wherein the location sensitive message comprises information related to the location which is characterized by the specific portion.

5. The apparatus of claim 4, wherein the apparatus is further caused to:
associate each portable device to a specific person; and
include the identity of the specific person in the location sensitive message.

6. The apparatus of claim 1, wherein the apparatus is further caused to:
generate several IMFSs based on acquired magnetic field vectors from several portable devices;
identify a specific portion which is present in a number of the IMFSs, wherein the number exceeds a predetermined threshold; and
consider the identified specific portion to be a characterizing feature related to a popular location inside the building.

7. The apparatus of claim 6, wherein the apparatus is further caused to:
upon detecting that a subsequently generated third IMFS, corresponding to acquired magnetic field vectors from a third portable device, comprises the identified specific portion, cause a transmission of a location sensitive message to the third portable device.

8. The apparatus of claim 1, wherein the apparatus is further caused to:
time stamp the magnetic field vectors used for generating the first IMFS and the second IMFS, thereby enabling the generation of the IMFSs with respect to time domain; and
acquire spatiotemporal information on the relative movement of the first portable device with respect to the second portable device inside the building on the basis of the comparison result.

9. The apparatus of claim 1, wherein the apparatus is further caused to:
acquire information on the topology of the building on the basis of detecting that parts of the first and second IMFSs are the same and parts of the first and second IMFSs of the IMFS s before or after which the first and the second IMFS are different to characterize a location of an intersection and) in the building.

10. The apparatus of claim 1, wherein the apparatus is further caused to:
detect variations exceeding a predetermined threshold in the generated first IMFS and in the second IMFS; and
apply only those parts of the first IMFS and of the second IMFS that exceed the predetermined threshold in the comparison.

11. The apparatus of claim 1, wherein the apparatus is further caused to:
acquire information indicating the geographical location of the portable devices, wherein the geographical location is based on at least one of the following techniques: a radio frequency based location, a global positioning system; and
determine the building or geographic area, among a plurality of buildings or geographic areas, in which the portable devices are on the basis of the indication of the geographical location.

12. The apparatus of claim 1, wherein each portable device is required to be checked-in to a registered account of a social network service before the portable device is allowed to provide magnetic field vectors to the server.

13. The apparatus of claim 1, wherein the apparatus is further caused to:
detect, based on the comparison, that the second portable device is moving at least partially along the same path as the first portable device;
detect that a third portable device, corresponding to a third generated IMFS, is moving in an opposite direction along the same path as the first portable device; and
determine that the second portable device and the third portable device will converge on their paths.

14. A method for acquiring information about relative movements of portable devices indoors, comprising:
utilizing at least one processor and at least one memory including a computer program code, the at least one memory and the computer program code being configured to, with the at least one processor, to:
acquire information indicating first indoor magnetic field vectors measured by a first portable device inside a building;
generate a first indoor magnetic field sequence, IMFS, on the basis of the first indoor magnetic field vectors;
acquire information indicating second indoor magnetic field vectors measured by a second portable device inside the building;
generate a second IMFS on the basis of the second indoor magnetic field vectors, wherein the first and the second IMFS s represent at least one of the magnitude and the direction of the Earth's magnetic field;
perform a comparison between at least part of the first IMFS and at least part of the second IMFS; and
acquire information on the relative movement of the first portable device with respect to the second portable device inside the building on the basis of the comparison result, wherein, for the acquisition of the information on the relative movement, the locations of the first portable device and the second portable device relative to the building are unknown and a magnetic field map of the building is not applied.

15. A computer program product embodied on a non-transitory distribution medium readable by a computer and comprising program instructions which, when loaded into an apparatus, execute the method comprising:
- acquiring information indicating first indoor magnetic field vectors measured by a first portable device inside a building;
- generating a first indoor magnetic field sequence, IMFS, on the basis of the first indoor magnetic field vectors;
- acquiring information indicating second indoor magnetic field vectors measured by a second portable device inside the building;
- generating a second IMFS on the basis of the second indoor magnetic field vectors, wherein the first and the second IMFS s represent at least one of the magnitude and the direction of the Earth's magnetic field;
- performing a comparison between at least part of the first IMFS and at least part of the second IMFS; and
- acquiring information on the relative movement of the first portable device with respect to the second portable device inside the building on the basis of the comparison result, wherein, for the acquisition of the information on the relative movement, the locations of the first portable device and the second portable device relative to the building are unknown and a magnetic field map of the building is not applied.

* * * * *